United States Patent [19]

Horton et al.

[11] Patent Number: 4,880,607

[45] Date of Patent: Nov. 14, 1989

[54] RECOVERING MINERAL VALUES FROM ORES

[75] Inventors: Robert L. Horton, Chagrin Falls, Ohio; George V. Lakey, Bartlesville, Okla.

[73] Assignee: Phillips Petroleum Company, Bartlesville, Okla.

[21] Appl. No.: 451,300

[22] Filed: Dec. 20, 1982

[51] Int. Cl.$^4$ .................. C22B 60/02; C01G 43/01
[52] U.S. Cl. ...................................... 423/20; 423/3; 423/658.5; 423/DIG. 15; 241/14; 241/22
[58] Field of Search ................ 423/1, 658.5, DIG. 15, 423/3, 17, 18, 20; 241/22, 14

[56] References Cited

U.S. PATENT DOCUMENTS

| | | | |
|---|---|---|---|
| 1,070,313 | 8/1913 | Adams | 423/18 |
| 1,195,698 | 8/1916 | McCoy | 423/18 X |
| 2,117,965 | 5/1938 | Kiesskalt et al. | 241/22 X |
| 2,843,450 | 7/1958 | Long, Jr. | 423/18 |
| 2,885,259 | 5/1959 | McCullough | 423/18 X |
| 3,817,457 | 6/1974 | Clark | 241/22 X |
| 3,985,553 | 10/1976 | Kunda et al. | 423/DIG. 15 X |

FOREIGN PATENT DOCUMENTS 457552 11/1936 United Kingdom ....... 423/DIG. 15

OTHER PUBLICATIONS

Editors, *Chemical Engineering,* vol. 64, No. 9 (1957), "How to Get Double Duty from Pebble Mill", p. 144.
Merritt, Robert C., *The Extractive Metallurgy of Uranium,* Colorado School of Mines Research Institute, 1971, pp. 33–34, 47–48, 59–63, 68, 70–73, 76–79, 270–273.
Tame, K. E. and J. B. Rosenbaum, *Beneficiation of Uranium Ores,* Bureau of Mines, RI 5884, 1961.

*Primary Examiner*—Matthew A. Thexton
*Attorney, Agent, or Firm*—Richmond, Phillips, Hitchcock & Umphlett

[57] ABSTRACT

Mineral values, particularly uranium, are recovered from mineral containing ore by separating the ore into a coarse fraction and a fines fraction, adding a diluent solid material, such as a portion of barren coarse fraction to the fines fraction and leaching the thus diluted fines fraction with a leach solution. The coarse fraction is separately leached, preferably under mild conditions of temperature and leach solution concentration. In another aspect, the total ore is leached, preferably under mild conditions, the thus leached ore is separated into a coarse fraction and a fines fraction, the fines fraction is again leached and at least a part of the leached fines fraction from the second leach step is recycled to the first leach step.

18 Claims, 2 Drawing Sheets

RECOVERING MINERAL VALUES FROM ORES

BACKGROUND OF THE INVENTION

The present invention relates to the extraction of mineral values from mineral-containing ores. In a more specific aspect, the present invention relates to the extraction of uranium values from uranium-containing ores.

Numerous minerals are present in subsurface earth formations in very small quantities which make their recovery extremely difficult. However, in most instances, these minerals are also extremely valuable, thereby justifying efforts to recover the same. An example of one such mineral is uranium. However, numerous other valuable minerals, such as copper, nickel, molybdenum, rhenium, silver, selenium, vanadium, thorium, gold, rare earth metals, etc., are also present in small quantities in subsurface formations, alone and quite often associated with uranium. Consequently, the recovery of such minerals is fraught with essentially the same problems as the recovery of uranium and, in general, the same techniques for recovering uranium can also be utilized to recover such other mineral values, whether associated with uranium or occurring alone. Therefore, a discussion of the recovery of uranium will be appropriate for all such minerals.

Uranium occurs in a wide variety of subterranean strata such as granites and granitic deposits, pegmatites and pegmatite dikes and veins, and sedimentary strata such as sandstones, unconsolidated sands, limestones, etc. However, very few subterranean deposits have a high concentration of uranium. For example, most uranium-containing deposits contain from about 0.01 to 1 weight percent uranium, expressed as $U_3O_8$ as is conventional practice in the art. Few ores contain more than about 1 percent uranium and deposits containing below about 0.1 percent uranium are considered so poor as to be currently uneconomical to recover unless other mineral values, such as vanadium, gold and the like, can be simultaneously recovered.

There are several known techniques for extracting uranium values from uranium-containing materials. One common technique is roasting of the ore, usually in the presence of a combustion supporting gas, such as air or oxygen, and recovering the uranium from the resultant ash. However, the present invention is directed to the extraction of uranium values by the utilization of aqueous leaching solutions. There are two common leaching techniques for recovering uranium values, which depend primarily upon the accessibility and size of the subterranean deposit. To the extent that the deposit containing the uranium is accessible by conventional mining means and is of sufficient size to economically justify conventional mining, the ore is mined, ground to increase the contact area between the uranium values in the ore and the leach solution, usually less than about 14 mesh but in some cases, such as limestones, to nominally less than 325 mesh, and contacted with an aqueous leach solution for a time sufficient to obtain maximum extraction of the uranium values. On the other hand, where the uranium-containing deposit is inaccessible or is too small to justify conventional mining, the aqueous leach solution is injected into the subsurface formation through at least one injection well penetrating the deposit, maintained in contact with the uranium-containing deposit for a time sufficient to extract the uranium values and the leach solution containing the uranium, usually referred to as a "pregnant" solution, is produced through at least one production well penetrating the deposit. The present invention is directed to the former, i.e., the leaching of ores.

The most common aqueous leach solutions are either aqueous acidic solutions, such as sulfuric acid solutions, or aqueous alkaline solutions, such as sodium carbonate and/or bicarbonate.

Aqueous acidic solutions are normally quite effective in the extraction of uranium values. However, aqueous acidic solutions generally cannot be utilized to extract uranium values from ore or in situ from deposits containing high concentrations of acid-consuming gangue, such as limestone. Aqueous alkaline leach solutions are applicable to all types of uranium-containing materials and are less expensive than acids.

The uranium values are conventionally recovered from acidic leach solutions by techniques well known in the mining art, such as direct precipitation, selective ion exchange, liquid extraction, etc. Similarly, pregnant alkaline leach solutions may be treated to recover the uranium values by contact with ion exchange resins, precipitation, as by adding sodium hydroxide to increase the pH of the solution to about 12, etc.

As described to this point, the extraction of uranium values is dependent to some extent upon the economics of mining versus in situ extraction and the relative costs of acidic leach solutions versus alkaline leach solutions. However, this is an oversimplification, to the extent that only uranium in its hexavalent state can be extracted in either acidic or alkaline leach solutions. While some uranium in its hexavalent state is present in ores and subterranean deposits, the vast majority of the uranium is present in its valence states lower than the hexavalent state. For example, uranium minerals are generally present in the form of uraninite, a natural oxide of uranium in a variety of forms such as $UO_2$, $UO_3$, $UO.U_2O_3$ and mixed $U_3O_8$ ($UO_2.UO_3$), the most prevalent variety of which is pitchblende containing about 55 to 75 percent of uranium as $UO_2$ and up to about 30 percent uranium as $UO_3$. Other forms in which uranium minerals are found include coffinite, carnotite, a hydrated vanadate of uranium and potassium having the formula $K_2(UO_2)_2(VO_4)_2.3H_2O$, and uranites which are mineral phosphates of uranium with copper or calcium, for example, uranite lime having the general formula $CaO.2UO_3.P_2O_5.8H_2O$. Consequently, in order to extract uranium values from ores with aqueous acidic or aqueous alkaline leach solutions, it is necessary to oxidize the lower valence states of uranium to the soluble, hexavalent state.

Combinations of acids and oxidants which have been suggested by the prior art include nitric acid, hydrochloric acid or sulfuric acid, particularly sulfuric acid, in combination with air, oxygen, sodium chlorate, potassium permanganate, hydrogen peroxide and magnesium dioxide, as oxidants. Alkaline leachates and oxidants heretofore suggested include carbonates and/or bicarbonates of ammonium, sodium or potassium in combination with air, oxygen or hydrogen peroxide, as lixivants. However, sodium bicarbonate and/or carbonate have been used almost exclusively in actual practice.

Numerous problems obviously arise in the leaching of uranium values from uranium-containing ores. One of the most obvious is, of course, the large quantities of ores being handled and treated compared with the amount of uranium recovered. Such large quantities of ores make it costly to crush and grind the same to a size which can be effectively leached in a relatively short period of time. For example, as previously pointed out, leached ore should be reduced in size to less than about 14 mesh, but an even smaller size, in the neighborhood of 100 to 400 mesh, or smaller, would be ideal. The cost of the latter, however, becomes prohibitive. It is, therefore, desirable to reduce the degree of grinding necessary. In addition, it would be highly desirable to reduce the quantities of ores handled in any given step of the process.

The large quantities of ores being treated also increase the amounts of leachant or lixivants and oxidants required in order to recover a given amount of uranium and/or attain such recovery in a reasonable time. Thus, it is also highly desirable to reduce the amounts of leachant or lixivant and oxidant to a minimum for effective results.

While the leaching operation can be carried out at temperatures from atmospheric temperature up to about the boiling point of water, it is known that the higher the temperature, the more effective and more rapid the leaching. Consequently, the usual range of temperatures is between about 80° and about 100° C. While this temperature range appears modest for most chemical operations, in the leaching of uranium-containing ore, the temperature becomes a very significant problem. This is true since, at the high temperatures employed, the cost of materials of construction of the leaching tanks is a major factor. For example, it is necessary to use rubber lined stainless steel tanks and the manufacturers of such tanks will not assure reasonable lifetimes for the linings. Consequently, the utilization of less expensive equipment is desirable and even a small reduction in the temperature of the leaching operation can substantially reduce equipment costs and lengthen equipment life.

While it is relatively easy to recover 50% to 60% of the uranium content of an ore, at relatively low temperatures, with relatively low concentrations of leach solution and in relatively short periods of time, such recoveries are not acceptable in industrial operations. For an economic operation, recoveries in excess of about 85% of the original uranium are required and usually above 90%. This, again, contributes substantially to the cost of leach solutions. Also, as in any other operation of this type, it is relatively easy to approach the desired and economic recoveries, but it is most difficult to attain recovery of those last small increments which are necessary or desirable for an effective and economic operation.

As in any industrial operation, the time required or rate is a significant economic factor. Consequently, it would also be highly desirable to be able to increase the rate of recovery, even though no greater recovery is obtained. Here again, even a very small increase in rate makes a substantial difference in the overall operation.

SUMMARY OF THE INVENTION

It is an object of the invention to provide a method of recovering mineral values from mineral-containing ores, which overcome the above problems and disadvantages of the prior art. Another object of the present invention is to provide a method for recovering mineral values from mineral-containing ores which reduces the degree of comminution of the ore necessary and/or cost of such comminution. Another and further object of the present invention is to provide an improved method for recovering mineral values from mineral-containing ores which reduces the volume of ores handled in at least one stage of the method. A further object of the present invention is to provide an improved method for recovering mineral values from mineral-containing ores which reduces the amount and/or cost of treating materials necessary. A still further object of the present invention is to provide a method for recovering mineral values from mineral-containing ores, which reduces the conditions of operation necessary. Yet another object of the present invention is to provide an improved method for recovering mineral values from mineral-containing ores which reduces the temperature of treatment. Another and further object of the present invention is to provide a method for recovering mineral values from mineral-containing ores which reduces the cost and/or extends the life of the treating equipment employed. Yet another object of the present invention is to provide a method for recovering uranium values from uranium-containing ores in accordance with any or all of the above objectives. These and other objects and advantages of the present invention will be apparent from the following description.

In accordance with the present invention, mineral values are recovered from mineral-containing ores, particularly uranium values from uranium-containing ores, by separating a ground ore into a coarse fraction and a fines fraction, preferably by wet classification, adding a diluent solid material, such as at least a part of a leached mineral-barren coarse fraction, a roasted barren ore, gravel, glass beads, etc., to the fines fraction, contacting the mixture of diluent solid material and the fines fraction with a leach solution, adapted to solvate a significant amount of the mineral values, in at least one contacting step, separating a pregnant leach solution, containing the thus solvated mineral values from residual solids and recovering the solvated mineral values from the pregnant leach solution. In another embodiment, the separated coarse fraction is separately leached preferably under mild conditions of temperature and leach solution concentration. In yet another embodiment, the total ore is leached under mild conditions, thereafter separated into a coarse fraction and a fines fraction, the fines fraction is leached and at least a part of the residual solids from the leaching of the fines fraction is recycled to the step of treating the total ore.

DESCRIPTION OF THE PREFERRED EMBODIMENTS

Figure 1:
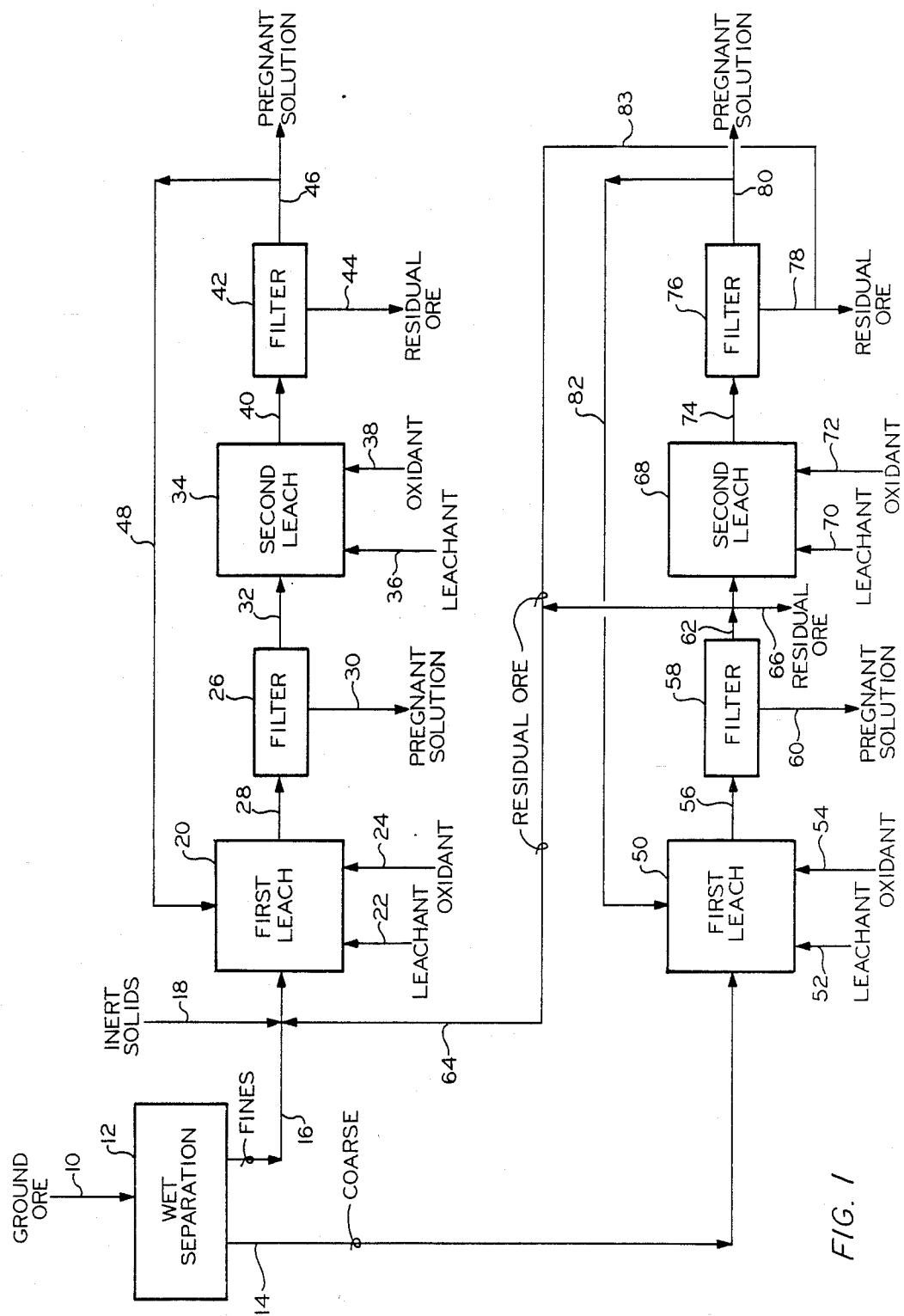
FIG. 1 is a flow diagram illustrating a system for carrying out the method of the present invention.

When utilized in the present application and in the claims, the term, "leachant", or "lixivant" is meant to include an acid or alkaline compound whose aqueous solution is adapted to dissolve or solvate and retain in solution mineral values.

When the term "diluent solid material" is utilized herein, this term is meant to include inert solids, such as gravel, glass beads, etc., or at least a part of larger particle size ground ore, leached ore, roasted ore, etc.

The term "barren" is meant to refer to any portion of an ore from which mineral values have been extracted to the economic or practical limit. By contrast, a "residual" ore may include any portion of the ore from which mineral values have been extracted to the practical or economic limit or any portion of the ore from which lesser amounts of mineral values have been extracted.

When "barren ore" or "residual ore" is to be disposed of without further extraction of mineral values, such ore will be generally referred to as "tailings".

When the term "alkaline" is utilized in the present application and in the claims, this term is meant to include salts having an alkali metal, an alkaline earth metal or ammonimum as a cation. The anion portion of these salts may be strongly basic anions, such as hydroxide, phosphate, sulfide or carbonate, or weakly basic anions, such as bicarbonate, acetate or dihydrogen phosphate.

When an ore is ground and separated into a coarse fraction and a fines fraction, the latter often being referred to as "slime", the fines fraction will normally contain a substantially larger quantity of mineral values, particularly uranium, as compared with the coarse fraction. In addition, it has been found that it is easier to leach uranium from the coarse fraction than from the fines fraction. Specifically, a greater percentage of the uranium can be leached from the coarse fraction with leach solutions of essentially the same concentration, essentially the same amount of uranium can be extracted from the coarse fraction with lower concentrations of leach solutions, the temperature of the leaching step can be lower in the leaching of the coarse fraction and/or essentially the same percentage of uranium can be leached from the coarse fraction, as compared with the fines fraction, in a shorter period of time. Consequently, substantial benefits can be attained by separately leaching the coarse and fine fractions. For example, by leaching the coarse fraction separately, the quantities of acid or alkali and oxidant can be reduced to some extent, thus reducing the cost of chemicals, a lower temperature can be used, the cost of equipment can be reduced and/or its life extended, the over all recovery of uranium can be increased and the time necessary in which a given amount of uranium can be recovered is reduced. It has also been discovered, in accordance with the present invention, that, if the separated fines fraction is mixed with a large particle size solid material, still further, significant improvements in the previously mentioned areas can also be obtained. While such benefits may be obtained by separately leaching the coarse fraction and the fines fraction, at mild conditions of leach solution concentration and temperature and at severe conditions of leach solution concentration and temperature, respectfully, it is also possible to carry out all of the leaching under mild conditions, thereby attaining still further benefits.

The following description, when read in conjunction with the drawings, will further illustrate the invention.

Referring first to FIG. 1, a mined ore is generally crushed and then ground, for example by the use of ball mills or rod mills. Conventionally, the ore is ground to a particle size less than about 100 mesh and in some cases, less than about 325 mesh, depending upon the nature of the ore. However, in accordance with the present invention, it is not necessary to grind the ore to this degree of fineness, but instead, the ore can be ground so that a majority passes a 30-mesh screen and preferably so that the majority passes a 14-mesh screen. Again, the size will vary according to the nature of the ore but over all will be substantially larger than conventional practice in the art. The ground ore is introduced to the system through line 10. The ore is then separated, as in wet separation zone 12, into a coarse fraction, which is discharged through line 14, and a fines fraction, discharged through line 16. Separation of the ore into a coarse fraction and a fines fraction may be done by screening, for example, to produce a fines fraction, of which a majority will pass through a 200-mesh screen or smaller. For example, one type of uranium-containing ore can be screened so that a majority passes a screen in the neighborhood of 400-mesh, while another specific uranium-containing ore would be screened so that the majority passes a screen in the neighborhood of about 300-mesh. However, it is preferred that the separation be carried out by wet classification, which is known to those skilled in the art of minerals recovery. In the present case, where wet classification is utilized, the solids which float in the solution are separated and are referred to herein as the fines fraction, whereas the solids which settle out are referred to herein as the coarse fraction. Applying wet classification to the two specific uranium-containing ores referred to above, wet classification resulted in a fines fraction, of which about 91% passed a 400-mesh screen in the first case and of which about 87% percent passed a 325-mesh screen in the second case. To the extent that inappropriate amounts of water are present in the coarse and/or fines fractions to form a suitable leaching slurry, water may be added or removed so that a proper solids content is provided, for example, between about 50% to 70% by weight of solids. In accordance with one embodiment of the present invention, a diluent solid material from an external source is added to the fines fraction through line 18. This diluent solid material is preferably an inert material, such as gravel, glass beads and the like, generally having about the same particle size as the previously mentioned coarse fraction of the ore, at least a portion of leached barren ore or roasted barren ore, etc. The amount of inert solids added to the fines fraction may be any appropriate amount, such as between about 40% and about 60% of the total weight of the mixture, preferably in the neighborhood of about 50%. This mixture is then introduced into a first leach zone 20. In leach zone 20, a leachant or lixivant, such as an acid or an alkaline material is added through line 22 and an appropriate oxidant is added through line 24. The amount of acid or alkaline material utilized conventionally is between about 180 and about 400 pounds per ton of ore. By contrast, in accordance with the present invention, amounts less than about 180 pounds per ton can be utilized. The amount of oxidant is generally between about the stoichiometric amount necessary for conversion of all of the uranium to a hexavalent state, up to as high as two times the stoichiometric amount. This will generally result in an oxidant concentration from about 10 to about 80 pounds per ton of ore. Again, in accordance with the present invention, amounts less than about ten pounds per ton can be utilized. As previously indicated, the leach temperature can be from atmospheric to about the boiling point of water and for best results, the temperature is usually between about 80° C. and about 100° C. In the specific embodiment being described, the first leach step 20 will be at severe conditions of leach solution concentration and temperature. Leaching operations, as such, may be carried out in a variety of known ways. For example, where a slurry of ore is preliminarily formed, the leaching step will ordinarily be a batch-type operation. On the other hand, it is possible to carry out the leaching in a continuous manner by introducing partially slurried ore, or dry ore, and a solution of the leachant and oxidant. Such a continuous operation may be carried out either by concurrently flowing the two materials or countercurrently flowing the same. Contacting times in the leaching step will also vary in accordance with the particle size of the ore, the concentration of leachant and oxidant and the temperature. Generally, contact times between about 24 and about 48 hours or more, are necessary. However, in accordance with the present invention, the contact time can be reduced below about 24 hours, for example, about 20 hours. Pregnant leach solution is then separated from the ore, the ore is washed with water to recover residual leach solution, usually in a countercurrent fashion, and all or part of the wash solution may be added to the leach solution. The pregnant leach solution is generally filtered to remove residual solids. In the schematized illustration given herein, this operation is represented by filter 26, which is supplied with the mixture of ore and leach solution through line 28. The pregnant leach solution is withdrawn through line 30 and is treated to recover uranium values in accordance with known procedures which have been heretofore mentioned in the introductory portion hereof. The residual solids from filter 26 are passed through line 32 to a second leach operation 34, which is supplied with leachant through line 36 and oxidant through line 38. This second leach operation may be carried out under the same conditions as the first leaching step or at milder conditions, if desired. The mixture of ore and leach solution is then passed through line 40 to the same type of separation operation previously described, as represented by filter 42. The residual ore is discharged through line 44 and is disposed of as tailings. The residual ore may be treated in some manner to separate the inert solids therefrom, but in most cases, judicious selection of an appropriate inert solid material will make such separation unnecessary. Pregnant leach solution from filter 42 is discharged through line 46 and will be treated in the same manner previously mentioned to recover uranium values therefrom.

While two stages of leaching are illustrated in accordance with the present embodiment, it is to be understood that more than two stages may be employed, for example, from 2 to 7 or more. At least a part of the pregnant leach solution from the last or intermediate leaching stages may be recycled to a previous leaching stage to thereby reduce the amount of leachant and oxidant necessary. Such recycle will also significantly increase the extraction of uranium if the pregnant leach solution, prior to separation of the uranium values, is recycled, as through line 48. This, of course, differs from the usual procedure wherein the uranium values are first recovered from the leach solution and the leach solution is then recycled for reuse.

If the coarse fraction from wet separation 12 and passing through line 14 is fed to a leaching stage 50, which in this case is referred to as a first leaching step since this is the first leaching of the coarse fraction, leachant is introduced to leaching step 50 through line 52 and oxidant through line 54. Leaching in leaching step 50 may be carried out under the same conditions as the leaching of the fines fraction previously described. However, it is preferred that the leaching of the coarse fraction be carried out under mild conditions. For example, a temperature below about 80° C. and utilizing leachant in an amount less than about 180 pounds per ton and oxidant in amounts less than about 10 pounds per ton. This, not only conserves leachant and oxidant, but reduces the cost of leaching equipment. For example, the leaching may be carried out in redwood tanks as opposed to the previously mentioned stainless steel rubber-lined tanks. It is also possible to utilize shorter contact times in leaching step 50. The mixture of leach solution and ore is then passed through line 56 to filter 58. Filter 58 represents the previously described separation of solids from a pregnant solution. The pregnant solution is discharged through line 60 and treated to recover uranium values therefrom. The separated solids are discharged from filter 58 to line 62. In accordance with another embodiment of the present invention, rather than utilizing an inert solid material for admixture with the fines fraction, at least a part of the residual ore passing through line 62 may be added to the fines fraction through line 64. Depending upon the amount of uranium remaining in the coarse fraction at this point, the residual ore may be a barren ore, in which case it will be essentially an inert material, or it may still contain recoverable amounts of uranium. In any event, the amount of residual ore added back to the fines fraction is less than the amount of coarse fraction originally separated from the total ore. In most cases, the residual ore will be a barren ore and further leaching thereof is unnecessary. Accordingly, the remaining portion of the barren ore may be removed from the system through line 66 as tailings and disposed of. Alternatively, the residual ore from filter 58 may be passed to a second leaching step 68, which is supplied with leachant through line 70 and oxidant through line 72. The conditions of operation in leaching step 68 may be the same as that of leaching step 50 or may be milder. The mixture of leach solution and ore from the second leaching step 68 is discharged through line 74 to a separation operation, as represented by filter 76. Residual ore from filter 76 is discharged through line 78, as tailings, and disposed of or part may be recycled through lines 83 and 64 where it is added to the fines fraction. Pregnant leach solution from filter 76 is passed through line 80 and uranium values may be recovered therefrom in a conventional manner. At least a part of the pregnant leach solution may be recycled through line 82 either after and preferably before separation of the mineral values therefrom.

Either the coarse or fines fraction can also be roasted and the roasted ore can be utilized as the diluent solid material, in yet another variation.

Figure 2:
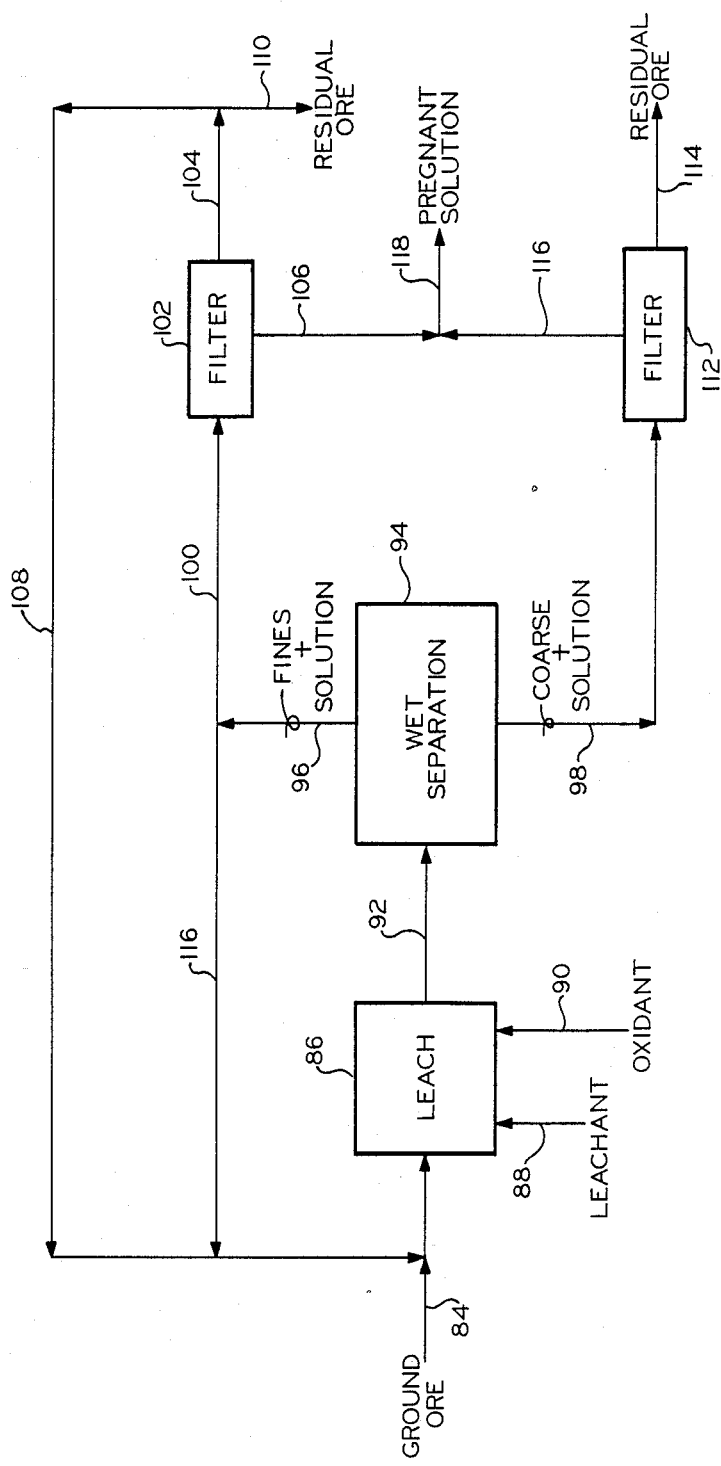
FIG. 2 is a flow diagram illustrating another system for carrying out the invention.

FIG. 2 of the drawings shows yet another embodiment of the present invention. In accordance with FIG. 2, ground ore is introduced through line 84 to a leach step 86. Leachant is supplied to leaching step 86 through line 88 and oxidant is supplied through line 90. Leach step 86 is preferably carried out under mild conditions, i.e., utilizing less than about 180 pounds per ton of leachant, less than about 10 pounds per ton of oxidant and at a temperature less than about 80° C. Ore and leach solution are discharged through line 92 to a separating means 94 wherein the ore is separated into a coarse fraction and a fines fraction. Separator means 94 is preferably a wet classifying means. The fines fraction containing a portion of the leach solution is discharged through line 96 and the coarse fraction containing the remainder of the leach solution is discharged through line 98. The fines fraction plus solution is then passed through line 100 to filter means 102 wherein residual ore is separated from the pregnant solution. Filter 102 may also be a decanting means. The residual ore is discharged from filter 102 through line 104 and the pregnant leach solution is discharged through line 106.

At least a part of the fines fraction, thus separated, is passed through line 108 and is added to fresh ground ore passing through line 84. Any remaining residual ore is passed through line 110 for disposal as tailings. The coarse fraction plus leach solution passing through line 98 is fed to a filter or classifier 112 where it is separated into a residual ore fraction and a pregnant leach solution. The residual ore is passed through line 114 for disposal as tailings and the pregnant leach solution is passed through line 116 where it may be combined with pregnant leach solution passing through line 106, in line 118, and thereafter treated for recovery of uranium values therefrom. By operating in accordance with this embodiment, it is possible to utilize mild conditions in the leaching of the ore, while still attaining maximum uranium recovery. It is also clear that the coarse fraction of the ore is leached only once, which is generally adequate, whereas the fines fraction may be repeatedly leached for maximum recovery of uranium. In addition, this system also incorporates the previously mentioned advantages of leaching the fines fraction in the presence of a controlled amount of a diluent solid material. As an alternative, at least a part of the fines fraction plus leach solution passing through line 96 can be passed through line 116 and combined with fresh ore passing through line 84.

The advantages of the present invention are exemplified by the following example of laboratory tests. In this series of tests, an ore containing uranium was crushed and ground to particle size less than about 14-mesh. In the first run, the total ore was extracted with sulfuric acid as a lixivant and sodium chlorate as an oxidant, in the amounts shown in the following table, at the temperature and for the time also listed in the table. A sample of the same ground ore was then wet classified to separate the same into a coarse fraction and a fines fraction. In this particular separation, the coarse fraction comprised 92.25 wt. percent of the total ore, whereas, the fines fraction comprised 7.75 wt. percent of the total ore. The coarse fraction was then separately leached, as set forth in the table. In a third run, a fines fraction was mixed with barren coarse ore, which had been extracted to its practical and economic limit, to provide equal weight amounts of the two fractions. This mixture was then leached under still more mild conditions. Finally, the residual ore from Run No. 3 was extracted a second time under the same conditions as Run No. 3.

| Run # | Sample Description | Leach Conditions* | | | | Residue (Wt % $U_3O_8$) |
|---|---|---|---|---|---|---|
| | | $H_2SO_4$ | $NaClO_3$ | °C. | Hours | |
| 1 | Total Ore | 240 | 15 | 80 | 20 | 0.006 |
| 2 | Coarse fraction | 180 | 9 | 75 | 20 | 0.006 |
| 3 | 50-50 mixture of fines and barren coarse | 150 | 9 | 75 | 20 | 0.044 |
| 4 | Residue from 3 | 150 | 9 | 75 | 20 | 0.0053 |

*Chemical quantities are in pounds per ton of ore treated

By comparing Runs 1 and 2, it is obvious that if a coarse fraction is separated from the total ore, this coarse fraction can be extracted at substantially milder conditions than the total ore and still reduce the uranium content of the residual ore to essentially the same amount. Runs 3 and 4 clearly demonstrate that, if barren coarse ore is mixed with the fines fraction, this blend can be leached in two stages under much more mild conditions and the residual uranium in the fines fraction reduced to even less than the first two runs. Based on the above, as well as other work in the extraction of the same ore, it was estimated that conventional leaching of the total ore would require approximately 240 pounds per ton of sulfuric acid and about 15 pounds per ton of sodium chlorate, whereas leaching in accordance with the present invention, would require 212.55 pounds per ton of sulfuric acid and 11.09 pounds per ton of sodium chlorate. This saving in chemicals would correspond to about 0.80 dollar per ton of ore processed, at chemical prices prevailing at the time of this invention.

While specific equipment, modes of operation and materials have been referred to herein, it is to be understood that such specific recitals are by way of illustration and to set forth the best mode of operation in accordance with the present invention and are not to be considered limiting.

That which is claimed:

1. A method for recovering uranium values from ground uranium-containing ore, comprising:
   (a) separating said ore into coarse and fines fractions;
   (b) adding to said fines fraction a diluent solid material, selected from the group consisting of (1) inert solids, (2) a barren part of said coarse fraction produced by leaching said coarse fraction to recover uranium therefrom to its economic or practical limit, and (3) a barren part of said coarse fraction produced by roasting said coarse fraction to recover uranium therefrom to its economic or practical limit, said diluent material having a particle size roughly equivalent to the particle size of said coarse fraction;
   (c) contacting the mixture of said fines fraction and said diluent solid material with a first leachant selected from the group consisting of (1) an aqueous alkaline solution containing an oxidant and (2) an aqueous acidic solution containing an oxidant, adapted to solvate a significant amount of said uranium values, in at least one mixed fines/diluent solid leaching step; and
   (d) separating a pregnant leach solution, containing the thus solvated uranium values, from residual solids.

2. A method in accordance with claim 1 wherein the ore is ground to a particle size of less than about 14 mesh.

3. A method in accordance with claim 1 wherein the ore is separated into a coarse fraction and a fines fraction by wet classification, the fines fraction comprising the portion of the ore which floats in water and the coarse fraction comprising the portion of the ore which settles from the solution.

4. A method in accordance with claim 1 wherein the fines fraction comprises less than about 15% by weight of the total ore.

5. A method in accordance with claim 1 wherein the diluent material is mixed with the fines fraction in an amount between about 40% and about 60% by weight of said fines fraction.

6. A method in accordance with claim 1 wherein the diluent material is an inert material.

7. A method in accordance with claim 6 wherein the inert material is glass beads.

8. A method in accordance with claim 6 wherein the inert material is gravel.

9. A method in accordance with claim 1 wherein the diluent material is a roasted part of the coarse fraction produced by roasting said coarse fraction to recover uranium therefrom to its economic or practical limit.

10. A method in accordance with claim 1 wherein the first leachant is an aqueous sulfuric acid solution containing sodium chlorate as an oxidant.

11. A method in accordance with claim 10 wherein the sulfuric acid is present in the first leachant in an amount less than about 180 pounds per ton of ore, the sodium chlorate is present in said first leachant in an amount of less than about 10 pounds per ton of ore and the mixed fines/diluent solid leaching step is carried out at a temperature less than about 80° C.

12. A method in accordance with claim 1 wherein the thus separated coarse fraction is separately contacted with a second leachant selected from the group consisting of (1) an aqueous alkaline solution containing an oxidant and (2) an aqueous acidic solution containing an oxidant, adapted to solvate a significant amount of said uranium values, in at least one coarse-fraction leaching step, the effluent from said coarse-fraction leaching step is separated into a pregnant leach solution, containing the thus solvated mineral values, and a barren coarse fraction, and at least a part of said barren coarse fraction is added to the mixed fines/diluent solid leaching step, as at least a part of the diluent solid.

13. A method in accordance with claim 12 wherein the leachant utilized in the coarse-fraction leaching step is an aqueous solution of sulfuric acid containing sodium chlorate as an oxidant.

14. A method in accordance with claim 13 wherein the leachant utilized in the coarse-fraction leaching step contains sulfuric acid in an amount less than about 180 pounds per ton of ore and sodium chlorate in an amount less than about 10 pounds per ton of ore and said coarse-fraction leaching step is carried out at a temperature below about 80° C.

15. A method in accordance with claim 12 wherein the leachant utilized in both the mixed fines/diluent solid leaching step and the coarse-fraction leaching step is an aqueous sulfuric acid solution containing sodium chlorate as an oxidant.

16. A method in accordance with claim 15 wherein the leachant in both the mixed fines/diluent solid leaching step and the coarse-fraction leaching step contains sulfuric acid in an amount less than about 180 pounds per ton of ore and sodium chlorate in an amount less than about 10 pounds per ton of ore and said mixed fines/diluent solid leaching step and said coarse-fraction leaching step are carried out at a temperature below about 80° C.

17. A method in accordance with claim 1 or 12 wherein the mixed fines/diluent solid leaching step comprises at least two mixed fines/diluent solid leaching steps and at least part of the pregnant leach solution from the last of said mixed fines/diluent solid leaching steps is recycled to the first of said mixed fines/diluent solid leaching steps.

18. A method in accordance with claim 12 wherein the coarse-fraction leaching step includes at least two coarse-fraction leaching steps and a part of the barren coarse fraction from the last of said coarse-fraction leaching steps is added to the mixed fines/diluent solid leaching step as at least part of the diluent solid.

* * * * *